United States Patent [19]

Meechan et al.

[11] 4,300,323
[45] Nov. 17, 1981

[54] FOAMED PLASTIC PANEL CONNECTING MEANS

[75] Inventors: Robert M. Meechan; Gabriel V. Gallina, both of Sacramento, Calif.

[73] Assignee: Owens-Corning Fiberglas Corporation, Toledo, Ohio

[21] Appl. No.: 130,880

[22] Filed: Mar. 17, 1980

[51] Int. Cl.³ ............................................. E04C 1/34
[52] U.S. Cl. ..................................... 52/464; 52/461; 52/282; 52/730
[58] Field of Search ................. 52/463, 464, 729, 730, 52/282, 460, 461, 469; 49/DIG. 1

[56] References Cited

U.S. PATENT DOCUMENTS

| Re. 25,030 | 8/1961 | Owen | 52/464 |
|---|---|---|---|
| 2,730,208 | 1/1956 | Valentine | 52/464 |
| 2,909,252 | 10/1959 | Sherron | 52/461 |
| 3,037,589 | 6/1962 | Cole | 49/DIG. 1 |
| 3,082,849 | 3/1963 | Keller | 52/466 |
| 3,125,192 | 3/1964 | Ramseur | 52/461 |
| 3,205,630 | 9/1965 | Felix | 52/464 |
| 3,466,826 | 9/1969 | Gallagher | 49/DIG. 1 |
| 4,158,938 | 6/1979 | Meechan | 52/463 |

Primary Examiner—Price C. Faw, Jr.
Assistant Examiner—Henry E. Raduazo
Attorney, Agent, or Firm—Ronald C. Hudgens; Philip R. Cloutier; Paul J. Rose

[57] ABSTRACT

A panel connecting means including front and rear clamping strips, a screw-receiving channel member, reinforced plastic means connected to and joining the rear clamping strip and the channel member, and screws extending through the front clamping strip and received in the channel member.

3 Claims, 4 Drawing Figures

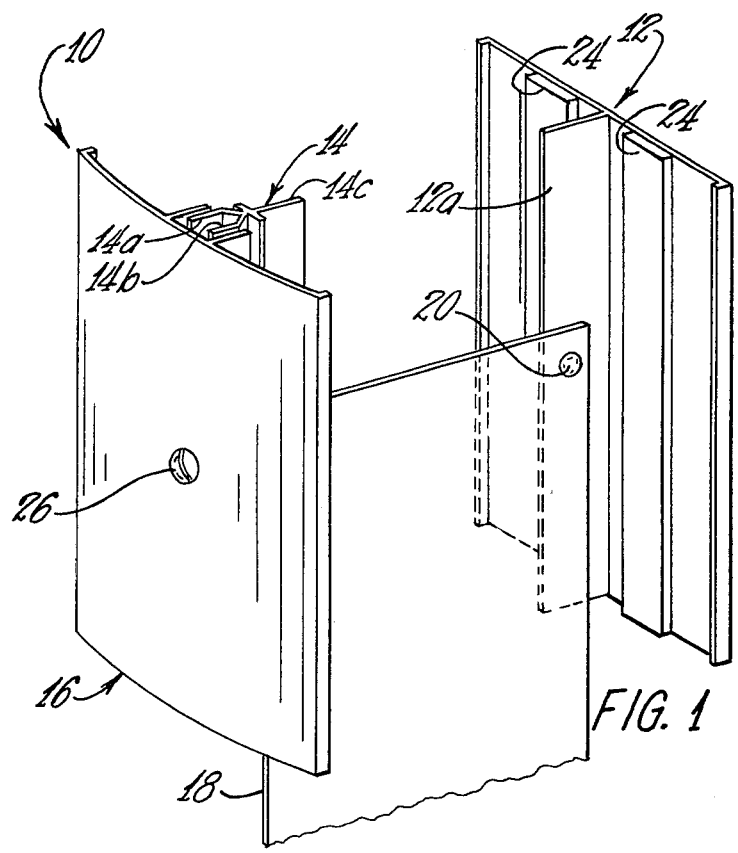
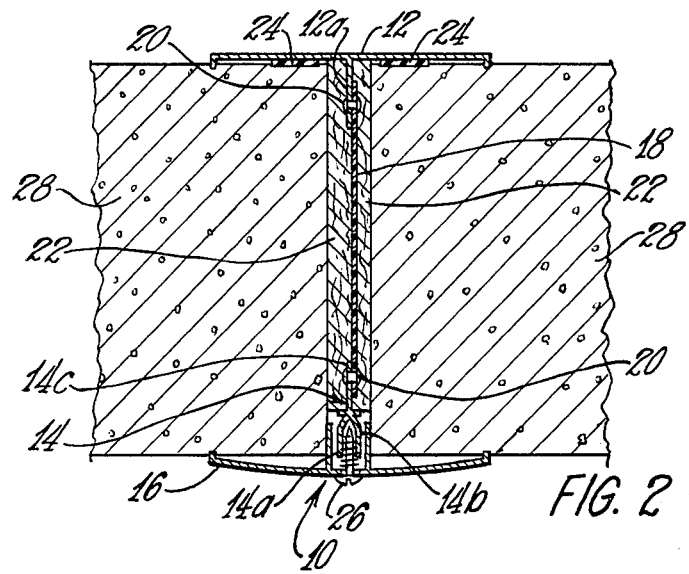

FOAMED PLASTIC PANEL CONNECTING MEANS

TECHNICAL FIELD

This invention relates generally to rooms formed by or lined with foam panels and used principally for cold storage. More particularly, the invention relates to means for connecting adjacent foam panels.

BACKGROUND ART

In our earlier panel connecting means illustrated in U.S. Pat. No. 4,158,938, fastening screws for gasketed clamping strips on opposites sides of the panels to be connected were screwed into vertically spaced plastic cylindrical double socket members disposed along and partially encased in an edge portion of one of the panels. Alignment problems between the screw holes in the clamping strips and the threaded sockets in the socket members made assembling difficult. This problem of alignment is overcome when one clamping strip is provided on an inner side with a longitudinally extending channel portion for receiving screws for the other clamping strip anywhere along the channel, as in U.S. Pat. No. 3,082,849, but the screws connecting such clamping strips would conduct too much heat into a cold storage room.

DISCLOSURE OF INVENTION

In accordance with our invention, a channel for receiving the screws for one of the clamping strips is connected to the other clamping strip by strips of glass fiber reinforced plastic and rivets.

BRIEF DESCRIPTION OF THE DRAWINGS

The details of our invention are described with reference to the accompanying drawings in which:

FIG. 1 is a fragmentary perspective view of a foam plastic panel connecting means constructed in accordance with the invention, with certain portions omitted;

FIG. 2 is a fragmentary horizontal sectional view of a pair of foam plastic panels connected by the connecting means of FIG. 1;

BEST MODE OF CARRYING OUT THE INVENTION

Figure 3:
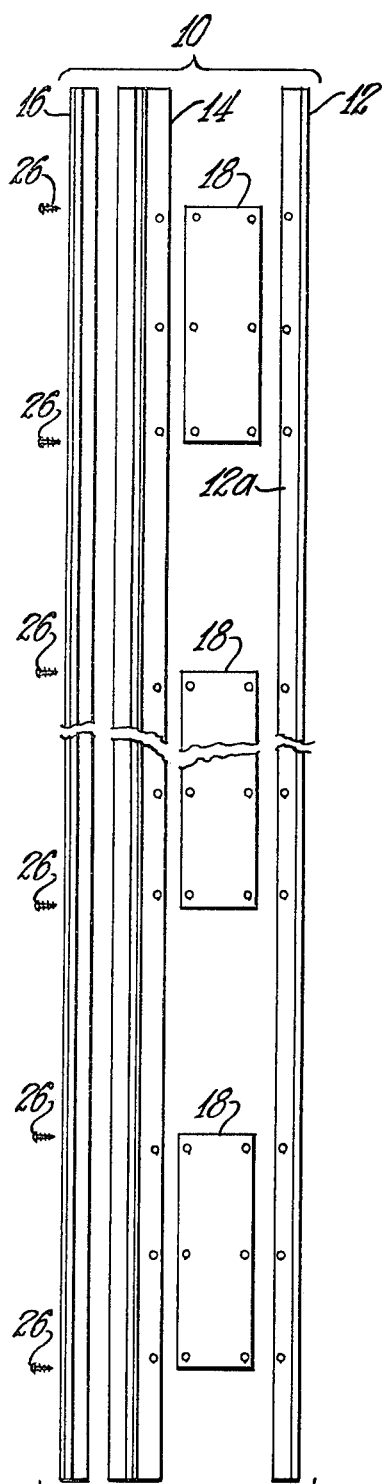
FIG. 3 is an exploded side elevational view of the connecting means of FIG. 1, with certain portions omitted.
Figure 4:
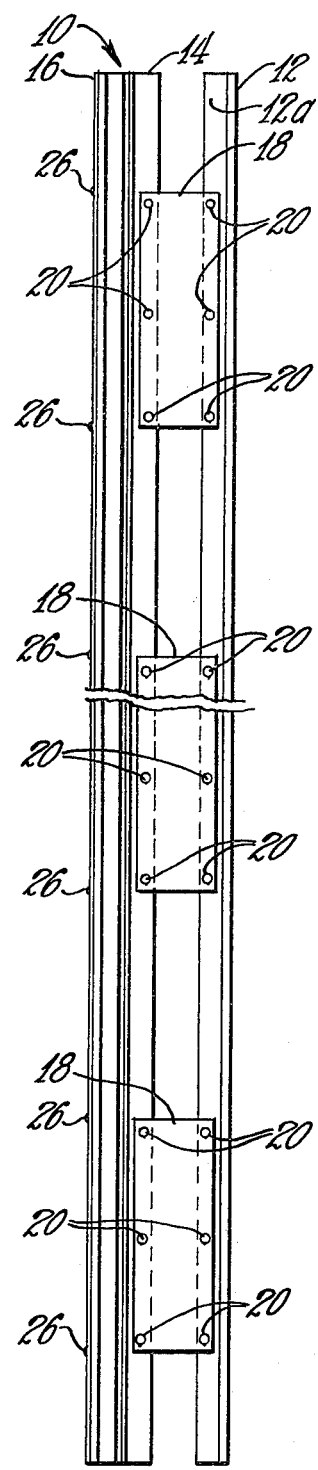
FIG. 4 is a side elevational view of the connecting means of FIG. 1 in an assembled condition, with certain portions omitted.

With reference to the drawings, a panel connecting means 10 constructed in accordance with the invention is shown in FIGS. 1–4 and includes a rear clamping strip 12, a screw-receiving channel member 14, and a front clamping strip 16, all preferably of extruded aluminum. The front clamping strip 16 has a double-trunked generally T-shaped cross section, the rear clamping strip 12 has a generally T-shaped cross section, and the channel member 14 has a generally Y-shaped cross section with parallel free end portions 14a and 14b on the branches of the Y-shape.

In the first step of assembling, the rear clamping strip 12 and the channel member 14 are connected together by a plurality of longitudinally spaced glass fiber reinforced plastic strips 18 each having opposite edge portions riveted respectively to a trunk portion 12a of the rear clamping strip 12 and a trunk portion 14c of the channel member 14 by a plurality of rivets 20.

Two elongated resilient compressible foam gaskets 22 shown only in FIG. 2 and having a length as long as the clamping strips 12 and 16 and the channel member 14 are adhesively secured to the plastic strips 18 respectively on opposite sides thereof. Between the plastic strips 18, the gaskets 22 are adhesively secured to each other.

After the gaskets 22 are in place, two elongated resiliently compressible polyvinylchloride foam gaskets 24 are adhesively secured to the inner surface of the rear clamping strip 12 respectively on opposite sides of the trunk portion 12a and adjacent the gaskets 24.

As the last assembling step in the factory, the front clamping strip 16 is secured in place by a plurality of screws 26 spaced longitudinally thereof, extending respectively through suitable holes therein, and partially threaded into the channel member 14 between the portions 14a and 14b.

At the job site, foamed plastic panels 28 (FIG. 2) are inserted between the clamping strips 12 and 16 respectively on opposite sides of the plastic strips 18 and the screws 26 are fully tightened.

It will be apparent that in cold storage rooms formed by or lined with foamed plastic panels such as the panels 28, a damaged panel can be replaced without disassembling an entire wall. It would only be necessary to remove two of the front clamping strips 16 respectively at opposite vertical edge portions of the damaged panel.

We claim:

1. A connecting means for connecting a pair of rigid foamed plastic panels, of a type not having rigid outer skins of a different material, in edge-to-edge relationship to partially form or line a cold storage room, the connecting means comprising an elongated metallic rear clamping strip of generally T-shaped cross section, an elongated metallic screw-receiving channel member of generally Y-shaped cross section with parallel free end portions on the branches of the Y-shape forming a screw-receiving channel, a plurality of glass fiber reinforced plastic strips spaced from each other, elongated in the same direction as the rear clamping strip and the channel member, and each riveted by a plurality of rivets spaced along opposite longitudinal edge portions respectively to trunk portions of the rear clamping strip and the channel member, an elongated metallic front clamping strip of generally double-trunked T-shaped cross section with a pair of parallel trunk portions straddling the channel member, and a plurality of screws spaced longitudinally of and extending through the front clamping strip between the pair of trunk portions into the screw-receiving channel member.

2. A connecting means as claimed in claim 1 including a pair of elongated resiliently compressible gasket strips adhesively secured to an inner surface of the rear clamping strip respectively on opposite sides of the trunk portion.

3. A connecting means as claimed in claim 1 including a pair of elongated resiliently compressible gasket strips adhesively secured respectively to opposite sides of the reinforced plastic strips.

* * * * *